No. 634,519. Patented Oct. 10, 1899.
S. BURKMAN.
COMBINED CLOTHES LINE AND CLOTHES PIN HOLDER.
(Application filed Dec. 12, 1898.)

(No Model.)

Witnesses:
R. J. Jacker.
E. A. Duggan.

Inventor:
Simon Burkman
By Chas. C. Tillman
Atty.

UNITED STATES PATENT OFFICE.

SIMON BURKMAN, OF CHICAGO, ILLINOIS.

COMBINED CLOTHES-LINE AND CLOTHES-PIN HOLDER.

SPECIFICATION forming part of Letters Patent No. 634,519, dated October 10, 1899.

Application filed December 12, 1898. Serial No. 698,983. (No model.)

*To all whom it may concern:*

Be it known that I, SIMON BURKMAN, a subject of the King of Sweden and Norway, residing at Chicago, in the county of Cook and State of Illinois, have invented certain new and useful Improvements in a Combined Clothes-Line and Clothes-Pin Holder, of which the following is a specification.

This invention relates to improvements in a device to be used as a receptacle for clothes-pins and a holder or reel for a clothes-line; and it consists in certain peculiarities of the construction, novel arrangement, and operation of the parts thereof, as will be hereinafter more fully set forth and specifically claimed.

The object of my invention is to provide a receptacle for a number of clothes-pins and a holder or reel for a clothes-line which shall be simple and inexpensive in construction, strong, and durable and by means of which a clothes-line and a number of pins may be kept together in such a manner as to prevent the pins being lost and the line becoming entangled or soiled.

In order to enable others skilled in the art to which my invention pertains to make and use the same, I will now proceed to describe it, referring to the accompanying drawings, in which—

Figure 1:
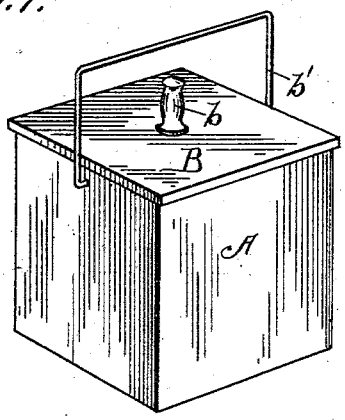
Figure 2:
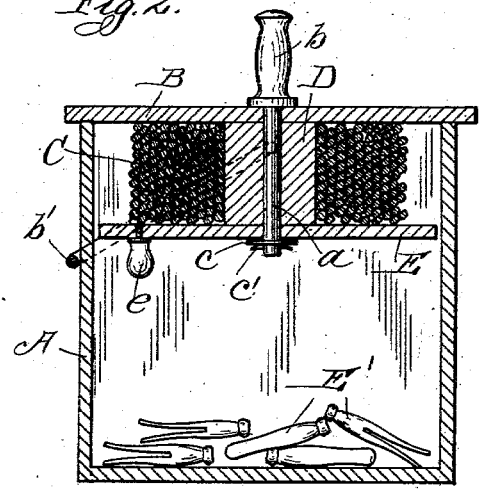
Figure 3:
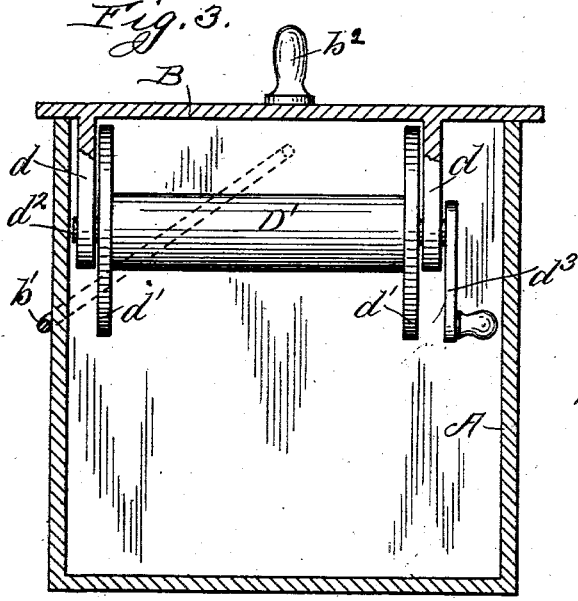
Figure 4:
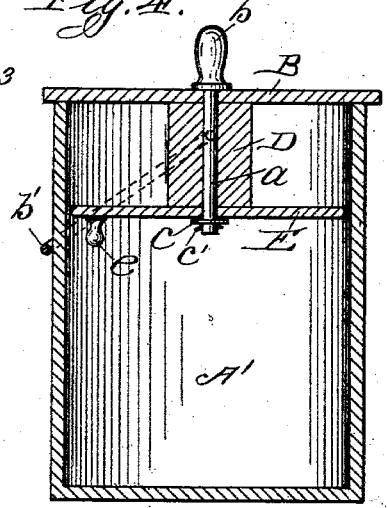

Figure 1 is a perspective view of my holder, showing it closed. Fig. 2 is an enlarged vertical sectional view thereof. Fig. 3 is a similar view illustrating a modification in the construction of the reel for the line, and Fig. 4 is a similar view showing a modification in the construction of the receptacle for the pins.

Similar letters refer to like parts throughout the different views of the drawings.

A represents a box which may be made of any suitable size and material, but preferably of wood and rectangular in shape. The upper end of this box is closed by means of a cover or top B, through the center of which passes and is journaled a spindle $a$, having on its outer end a handle $b$, used for removing the cover and holding the same when it is being used as a reel on which to wind the clothes-line C, which may be of the ordinary kind. Mounted on the spindle $a$ is a drum D, to which one end of the clothes-line may be secured and around which it is wound. On the inner or lower portion of the spindle $a$ is secured by means of a washer $c$ and a pin $c'$ a plate E, which is of a shape in outline to correspond with the cavity of the box or receptacle and forms a part of the reel or line-holder. This plate is provided on its lower surface with a handle $e$ to be used for turning the reel when it is desired to wind the line thereon and is held at a sufficient distance from the cover B to provide a space between it and said cover for the reception of the clothes-line. As shown in Fig. 2 of the drawings, the plate E is somewhat smaller than the interior of the box or receptacle A, so as to pass thereinto and to prevent the cover B being dislocated. The handle $b$ may be rotatably secured on the spindle $a$ and the cover B, drum D, and plate E, comprising the reel, fixed to said spindle, or the handle may be fixed thereto and the reel rotatably secured thereon. The lower portion of the box or receptacle A may be used for the deposit of clothes-pins E' or other articles.

In Fig. 3 I have shown a modification in the construction of the reel or line-holder, which consists in providing the cover B with a handle $b^2$, two downwardly-extending brackets $d$, within whose lower portion is journaled a drum or roller D', which has on each of its ends a disk $d'$ to hold the line in position when it is being wound on the roller or drum. Secured to one end of the shaft $d^2$ of the roller or drum is a crank $d^3$, employed for turning it. In this modification the brackets $d$, in which the roller D' is journaled, and the crank $d^3$ for turning said roller or drum will extend into the receptacle A and be located therein in such a manner as to prevent the cover being accidentally dislocated.

In Fig. 4 of the drawings I have shown a modified construction of the receptacle, which consists in making it cylindrical in shape instead of rectangular, as shown in the other figures of the drawings. In this modification, which is more especially designed as a toy, the receptacle may be turned out of one piece of material, and the clothes-line holder or reel may be of either of the constructions shown in Figs. 2 and 3 and above described; but I prefer to use the construction shown in Fig. 4.

Instead of making the sides of the box or receptacle square, as shown in Figs. 1 to 3, inclusive, I may make them deeper, thus making the receptacle deeper, and may provide it with a bail $b'$, of any suitable kind and material.

Having thus fully described my invention, what I claim as new, and desire to secure by Letters Patent, is—

1. The combination with a receptacle, of a cover therefor provided with a handle to remove and hold the same, a spindle journaled in the cover, a drum mounted on the spindle, and a plate secured on the lower end of the spindle and provided with a handle to turn the same, said plate being slightly smaller in outline than the interior of the receptacle, substantially as described.

2. The combination with a receptacle having its upper portion open, of a cover therefor provided on its upper surface with a handle to remove and hold the same, a drum or reel located on the lower surface of the cover and having members so disposed that they will extend into the receptacle and near the walls thereof, in such a manner as to prevent accidental dislocation of the cover, substantially as described.

SIMON BURKMAN.

Witnesses:
CHAS. C. TILLMAN,
E. A. DUGGAN.